United States Patent
Zhang et al.

(10) Patent No.: US 11,182,602 B2
(45) Date of Patent: Nov. 23, 2021

(54) METHOD AND SYSTEM FOR PERSON RE-IDENTIFICATION

(71) Applicant: Peking University, Beijing (CN)

(72) Inventors: Shiliang Zhang, Beijing (CN); Dongkai Wang, Beijing (CN)

(73) Assignee: Peking University, Beijing (CN)

( * ) Notice: Subject to any disclaimer, the term of this patent is extended or adjusted under 35 U.S.C. 154(b) by 0 days.

(21) Appl. No.: 17/021,102

(22) Filed: Sep. 15, 2020

(65) Prior Publication Data

US 2021/0319215 A1      Oct. 14, 2021

(30) Foreign Application Priority Data

Apr. 8, 2020  (CN) .......................... 202010269718.6

(51) Int. Cl.
*G06K 9/00*  (2006.01)
*G06K 9/62*  (2006.01)
*G06N 3/08*  (2006.01)

(52) U.S. Cl.
CPC ......... *G06K 9/00362* (2013.01); *G06K 9/628* (2013.01); *G06K 9/6215* (2013.01); *G06K 9/6232* (2013.01); *G06K 9/6259* (2013.01); *G06N 3/088* (2013.01)

(58) Field of Classification Search
CPC .. G06K 9/00362; G06K 9/628; G06K 9/6232; G06K 9/6215; G06K 9/6259; G06N 3/088
See application file for complete search history.

(56) References Cited

U.S. PATENT DOCUMENTS

| | | | |
|---|---|---|---|
| 11,074,478 B2 * | 7/2021 | Mau ........................ | G06K 9/627 |
| 2021/0042580 A1 * | 2/2021 | Chen ..................... | G06T 3/4046 |
| 2021/0081766 A1 * | 3/2021 | Cohen .................... | G06N 3/084 |
| 2021/0103771 A1 * | 4/2021 | Aides .................. | G06K 9/6271 |

* cited by examiner

*Primary Examiner* — Dhaval V Patel
(74) *Attorney, Agent, or Firm* — Scully Scott Murphy & Presser

(57) ABSTRACT

The present application discloses a method and a system for person re-identification, the method including: inputting a training set to a model-to-be-trained, and determining a single-class label and memory features of each image data in the training set; determining multi-class labels through positive label prediction according to the single-class labels and a memory feature set; determining classification scores according to image features of each image data in the training set and the memory feature set; determining a multi-label classification loss according to the multi-class labels and the classification scores; and updating and training the model-to-be-trained to obtain a re-identification model according to the multi-label classification loss. The classification scores are determined according to the image features of each image data in the training set and the memory feature set, which is not affected by the domain gap; the multi-class labels are determined through positive label prediction according to the single-class labels and the memory feature set; then, the multi-label classification loss is determined according to the multi-class labels and the classification scores, and the model-to-be-trained is updated and trained, so that the resulting re-identification model has high performance, strong robustness and low cost.

10 Claims, 4 Drawing Sheets

METHOD AND SYSTEM FOR PERSON RE-IDENTIFICATION

TECHNICAL FIELD

The present application relates to the field of image processing; in particular, the present application relates to a method and a system for person re-identification.

BACKGROUND

In recent years, the person re-identification technology, in which deep convolutional neural networks are used to learn features from labeled person images, has achieved great success. However, due to the high cost of annotating person images on multiple cameras, recent research work has begun to focus on unsupervised person re-identification. Unsupervised person re-identification aims to learn discriminative features from unlabeled person images. As compared with supervised learning, unsupervised learning alleviates the need for expensive data annotations, thereby exhibiting better potential and promoting person re-identification towards practical applications.

The challenge of person re-identification is to learn discriminative features without real labels. To overcome this challenge, the following three ways are typically used in existing methods for person re-identification: hand-crafted features; using clustering estimated pseudo-labels to train deep convolutional neural networks; and using transfer learning to improve unsupervised person re-identification.

However, the hand-crafted feature method has great difficulties in terms of robustness and discriminative feature design. The method of using clustering estimated requires a good pre-trained model which is hard to obtain.

Most of the recent work treats person re-identification as a transfer learning task, which uses labeled data in other domain for model initialization or label transfer. However, there is still a considerable gap between supervised person re-identification and unsupervised person re-identification. At the same time, the setting of transfer learning leads to limited flexibility. Since the performance of transfer learning is closely related to the domain gap, a great gap will deteriorate the performance. Therefore, in person re-identification, it is very important but hard to estimate the domain gap and select an appropriate source data set for transfer learning, which will have an influence on the performance of re-identification.

In summary, there is a need to provide a method and a system for person re-identification that are not affected by the domain of data set, has high performance, strong robustness and low cost.

SUMMARY

In order to solve the above problems, the present application proposes a method and a system for person re-identification.

In a first aspect, the present application proposes a method for person re-identification, which includes:
inputting a training set to a model-to-be-trained, and determining a single-class label and memory features of each image data in the training set;
determining multi-class labels through positive label prediction according to the single-class labels and a memory feature set;
determining classification scores according to image features of each image data in the training set and the memory feature set;
determining a multi-label classification loss according to the multi-class labels and the classification scores; and
updating and training the model-to-be-trained to obtain a re-identification model according to the multi-label classification loss.

Preferably, the determining the single-class label and memory features of each image data in the training set includes:
labeling each image data in the unlabeled training set using a single-class label to obtain multiple single-class labels; and
performing feature extraction on the unlabeled training set to obtain image features, and using a memory feature update formula to calculate memory features so as to obtain a memory feature set that includes all the memory features.

Preferably, the memory feature update formula is: $M[i]^t = a f_i + (1-a) M[i]^{t-1}$, wherein the superscript t represents the $t^{th}$ training epoch, a is an update rate, M[i] is the memory feature set, and $f_i$ is the image feature.

Preferably, before obtaining the memory feature set that includes all the memory features, the method further includes:
normalizing the obtained memory features.

Preferably, the determining multi-class labels through positive label prediction includes:
calculating similarity scores between the memory features in the memory feature set;
determining first candidate labels of each image data according to the single-class label, the similarity scores and a candidate threshold;
eliminating hard negative labels from the first candidate labels to obtain a second candidate label set corresponding to each image data;
setting the second candidate labels in each second candidate label set to 1 to obtain a positive label set corresponding to the second candidate label set; and
determining the multi-class label corresponding to each image data according to the positive label set.

Preferably, the determining the multi-label classification loss according to the multi-class labels and the classification scores includes:
determining the multi-label classification loss according to the multi-class labels and the classification scores by using a multi-label classification loss formula, the multi-label classification loss formula being:

$$L_{MMCL} = \sum_{i=1}^{n} D(M^T \times f_i, \overline{y}_i),$$

wherein the classification score is $M^T \times f_i$, $\overline{y}_i$ is the multi-class label, and D(•) is the calculation of the multi-label classification loss $L_{MMCL}$ by comparing the classification score and the multi-class label.

Preferably, after updating and training the model-to-be-trained to obtain the re-identification model according to the multi-label classification loss, the method further includes:
using the obtained re-identification model to re-identify persons.

Preferably, before updating and training the model-to-be-trained to obtain the re-identification model according to the multi-label classification loss, the method further includes:

if there is a labeled data set, using the sum of cross-entropy loss, triplet loss and the multi-label classification loss as the loss of updating and training the model-to-be-trained.

Preferably, each image data in the training set is unlabeled data, and each image data includes only one person.

In a second aspect, the present application proposes a system for person re-identification, which includes:

a feature extraction module, which is configured to determine a single-class label and memory features of each image data in a training set input to a model-to-be-trained, and determine classification scores according to image features of each image data in the training set and a memory feature set;

a label prediction module, which is configured to determine multi-class labels through positive label prediction according to the single-class labels and the memory feature set; and a loss calculation and update module, which is configured to determine a multi-label classification loss according to the multi-class labels and the classification scores, and update and train the model-to-be-trained to obtain an re-identification model according to the multi-label classification loss.

The present application has the following advantages: the classification scores are determined according to the image features of each image data in the training set and the memory feature set, which is not affected by the domain gap; the multi-class labels are determined through positive label prediction according to the single-class labels and the memory feature set; then, the multi-label classification loss is determined according to the multi-class labels and the classification scores, and the model-to-be-trained is updated and trained, so that the resulting re-identification model has high performance, strong robustness and low cost.

BRIEF DESCRIPTION OF THE DRAWINGS

Upon reading a detailed description of the preferred embodiments below, various other advantages and benefits will become clear to those skilled in the art. The drawings are only for the purpose of illustrating the preferred embodiments, and should not be considered as limiting the present application. Throughout the drawings, identical parts are denoted by identical reference signs, in which.

DETAILED DESCRIPTION

Figure 1:
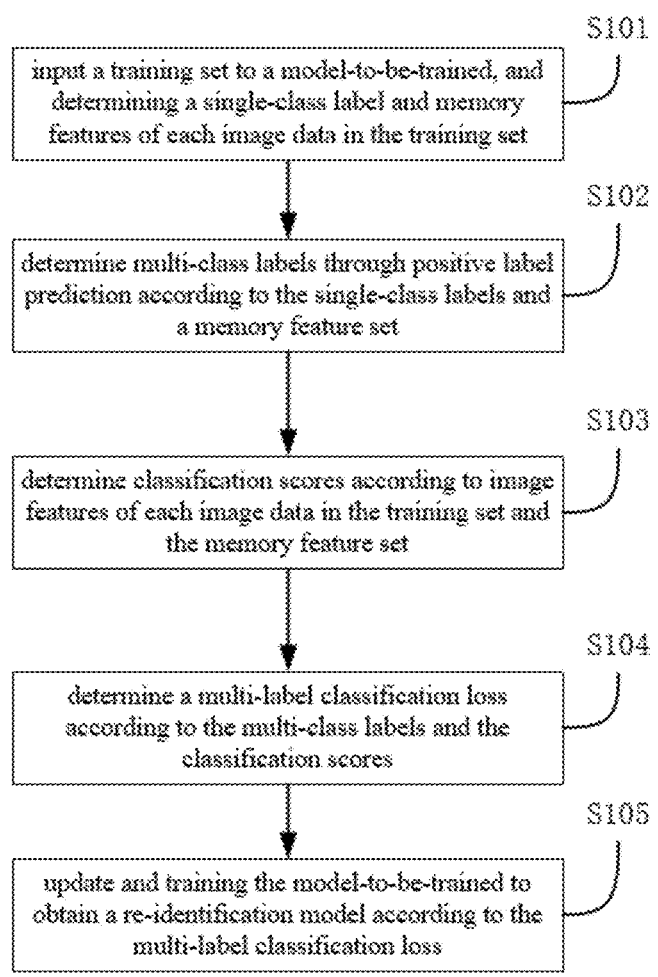
FIG. 1 is a schematic diagram illustrating steps of a method for person re-identification provided by the present application.

Hereinafter, exemplary embodiments of the present disclosure will be described in more detail with reference to the accompanying drawings. Although the exemplary embodiments of the present disclosure are shown in the drawings, it should be understood that the present disclosure can be implemented in various forms and should not be limited by the embodiments set forth herein. Rather, these embodiments are provided to enable a more thorough understanding of the present disclosure and to fully convey the scope of the present disclosure to those skilled in the art.

According to an embodiment of the present application, as shown in FIG. 1, a method for person re-identification is proposed, which includes:

S101, inputting a training set to a model-to-be-trained, and determining a single-class label and memory features of each image data in the training set;

S102, determining multi-class labels through positive label prediction according to the single-class labels and a memory feature set;

S103: determining classification scores according to image features of each image data in the training set and the memory feature set;

S104: determining a multi-label classification loss according to the multi-class labels and the classification scores; and S105: updating and training the model-to-be-trained to obtain a re-identification model according to the multi-label classification loss.

The determining the single-class label and memory features of each image data in the training set includes:

labeling each image data in the unlabeled training set using a single-class label to obtain multiple single-class labels; and performing feature extraction on the unlabeled training set to obtain image features, and using a memory feature update formula to calculate memory features so as to obtain a memory feature set that includes all the memory features.

The memory feature update formula is:
$M[i]^t = a f_i + (1-a) M[i]^{t-1}$, wherein the superscript t represents the $t^{th}$ training epoch, a is an update rate, $M[i]$ is the memory feature set, and $f_i$ is the image feature.

Before obtaining the memory feature set that includes all the memory features, the method further includes:

normalizing the obtained memory features.

The determining multi-class labels through positive label prediction includes:

calculating similarity scores between the memory features in the memory feature set;

determining first candidate labels of each image data according to the single-class label, the similarity scores and a candidate threshold;

eliminating hard negative labels from the first candidate labels to obtain a second candidate label set corresponding to each image data;

setting the second candidate labels in each second candidate label set to 1 to obtain a positive label set corresponding to the second candidate label set; and determining the multi-class label corresponding to each image data according to the positive label set.

The determining the multi-label classification loss according to the multi-class labels and the classification scores includes:

determining the multi-label classification loss according to the multi-class labels and the classification scores by using a multi-label classification loss formula, the multi-label classification loss formula being:

$$L_{MMCL} = \sum_{i=1}^{n} D(M^T \times f_i, y_i),$$

the classification score is $M^T \times f_i$, $\bar{y}_i$ is the multi-class label, and D (•) is the calculation of the multi-label classification loss $L_{MMCL}$ by comparing the classification score and the multi-class label.

After updating and training the model-to-be-trained to obtain the re-identification model according to the multi-label classification loss, the method further includes:

using the obtained re-identification model to re-identify persons.

Before updating and training the model-to-be-trained to obtain the re-identification model according to the multi-label classification loss, the method further includes:

if there is a labeled data set, using the sum of cross-entropy loss, triplet loss and the multi-label classification loss as the loss of updating and training the model-to-be-trained.

Each image data in the training set is unlabeled data, and each image data includes only one person.

The number of single-class labels corresponds to the number of image data in the training set, and each image data corresponds to one single-class label.

Figure 2:
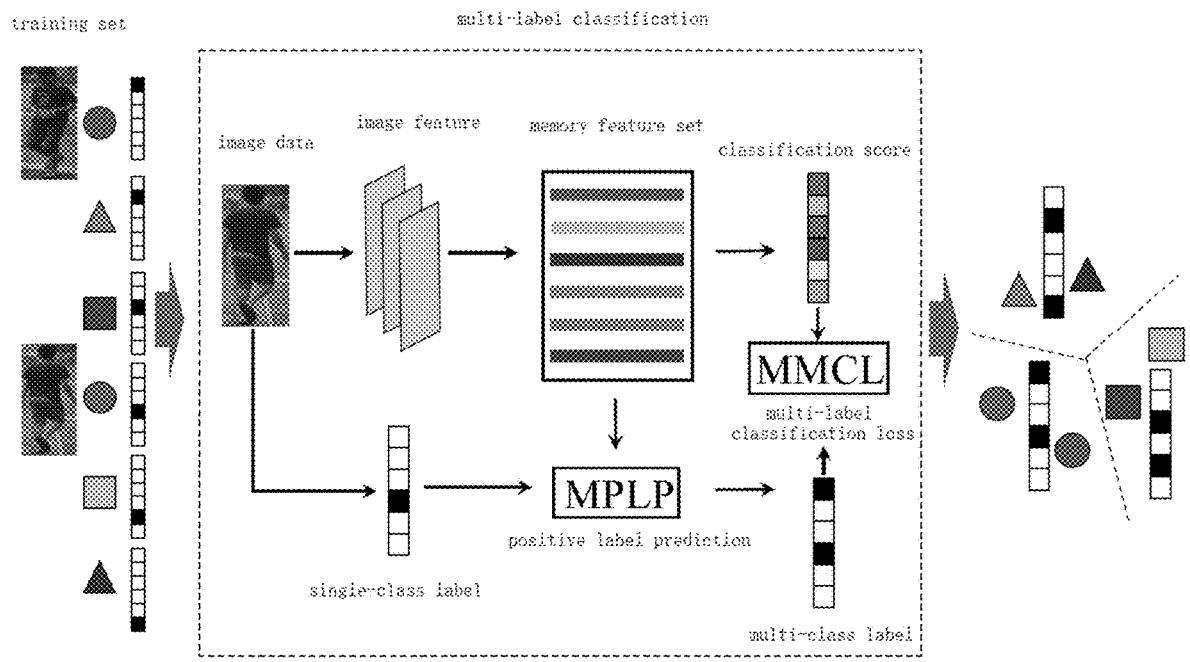
FIG. 2 is a schematic diagram of a method for person re-identification provided by the present application.

As shown in FIG. 2, suppose there are six (6) pictures in a data set, which are the first, second, third, fourth, fifth and sixth pictures from top to bottom. The first and fourth pictures are the same person A, the second and sixth pictures are the same person B, and the third and fifth pictures are the same person D. Then, it is required to finally divide these six pictures into three classes, in which each class corresponds to one person.

First, each picture data is assigned with a single-class label. The single-class label is an array or matrix, wherein the number of figures corresponds to the number of picture data. Then, the single-class label of the first picture data is [1, 0, 0, 0, 0, 0], the single-class label of the second picture data is [0, 1, 0, 0, 0, 0], and so on. The six (6) picture data are assigned with single-class labels. The picture data are input into a convolutional neural network, and image features are extracted to obtain image features of each picture data. Memory features are calculated according to the image features. A memory update formula is used for calculating the memory features, and the obtained memory features are normalized so as to obtain a memory feature set that includes all the memory features.

Then, multi-class labels are determined through memory-based positive label prediction (MPLP), i.e., positive label prediction, according to the single-class label of each image data and the memory feature set.

The positive label prediction includes: calculating similarity scores between the memory features in the memory feature set. First candidate labels of each image data are determined according to the single-class label, the similarity scores and a candidate threshold. Hard negative labels are eliminated from the first candidate labels to obtain a second candidate label set corresponding to each image data. The second candidate labels in each second candidate label are set to 1 to obtain a positive label set corresponding to the second candidate label set.

The similarity scores are ranked from the highest to the lowest. Then according to the candidate threshold, one or more first candidate labels corresponding to each image data, whose similarity scores exceed the candidate threshold, are determined.

Eliminating the hard negative labels is to make a comparison between the first candidate labels of individual image data to determine whether the first candidate labels of the picture data having a high similarity correspond to each other. If the first candidate labels of the first image data include the second image data and the third image data, the first candidate labels of the second image data include the third image data, and the first candidate labels of the third image data include the first image data but does not include the second image data, then the first image data and the third image data are images of the same person. Although the first candidate labels of the first image data include the second image data, the first candidate labels of the second image data do not include the first image data, so the first image data and the second image data are images of different persons. Similarly, the second image data and the third image data are also images of different persons.

The second candidate label set of the first image data is [0, 0, 1, 0, 0, 0], and the second candidate label set of the third image data is [1, 0, 0, 0, 0, 0]. The obtained multi-class label indicating that the first image data and the third image data are images of the same person is [1, 0, 1, 0, 0, 0].

According to the image features of each image data in the training set and the memory feature set, a multi-label classification loss $L_{MMCL}$ is determined according to the multi-class labels and the classification scores by using a memory-based multi-label classification loss (MMCL) formula $$L_{MMCL} = \sum_{i=1}^{n} D(M^T \times f_i, y_i),$$

i.e., a multi-label loss formula.

According to the obtained multi-label classification loss, the model-to-be-trained is updated and trained. When the loss is less than a set training loss threshold, or after the number of times of training or the training epochs reach a set threshold of the number of times or a set cycle threshold, a re-identification model is obtained. The multi-label classification loss is used to update and train the feature extraction part which is based on the convolutional neural network. The obtained re-identification model is used to re-identify persons.

If there is also a labeled data set, the labeled data set may be used. The labeled data set is input into the existing model using the existing method to obtain cross-entropy loss and triplet loss. Then, the sum of the cross-entropy loss, the triplet loss and the multi-label classification loss obtained in the embodiment of the present application is used as the loss of updating and training the model-to-be-trained in the embodiment of the present application.

In the following, the embodiments of the present application will be further described.

Given an unlabeled image data set $X=(x_1, x_2, \ldots x_n)$ of a person as the training set, the goal is to train the person re-identification model-to-be-trained through the training set X. For any image data q to be queried in the data set X, a feature vector needs to be generated in order to retrieve image data g containing the same person from a library set G. That is, the finally obtained re-identification model should ensure that in the library set G, compared with other image data, the image data q and the image data g have more similar features; therefore, the target g* of person re-identification can be conceptually expressed as:

$$g^* = \operatorname*{argmin}_{g \in G} dist(f_g, f_q) \tag{1}$$

wherein $f \in \mathbb{R}$ is the d-dimensional L2 standardized feature vector extracted by the person re-identification model. dist (•) is a distance measure, such as L2 distance. Only one person is included in each image data in the data set X.

In order to make it is possible to train on X, each image data $x_i$ in the training set is first treated as a single class, and a label $y_i$ is assigned to $x_i$. This pseudo label turns X into a label data set and allows for training of ReID (person re-identification) model. The label $y_i$ is a single-class label of the image data $x_i$. $y_i$ is initialized as a binary vector, wherein only the value at index i is set to 1, and the other values are set to −1. j in formula (2) represents the class ID.

$$y_i[j] = \begin{cases} 1 & j = i \\ -1 & j \neq i \end{cases} \quad (2)$$

Since each person has multiple image data in X, the initial label vector is invalid when representing the person's identity clue. Label prediction needs to assign a multi-class label to each image data, so that the person re-identification model can be trained through the multi-label classification loss. The label of $x_i$ can be predicted by referring its image feature $f_i$ to the image features of other images and by finding a consistent feature set. On the other hand, due to the large number of image classes in X, training a multi-label classifier is difficult. Therefore, $f_i$ can be used as the classifier of the $i^{th}$ class. The following formula is used to calculate the classification score $c_j[i]$ of any image data $x_j$, $$c_j[i] = f_i^T \times f_j \quad (3)$$

wherein $c_j$ represents the multi-label classification score of $x_j$, the superscript T is the transposition symbol, and $f_j$ represents the image feature of the $j^{th}$ image data.

Since both the label prediction and the multi-label classification need image features of each image data in X, a n×d sized storage library M needs to be introduced to store these features, wherein $M[i]=f_i$. In M, a memory-based positive label prediction (MPLP) (i.e., positive label prediction) and a memory-based multi-label classification loss (MMCL) (i.e., multi-label loss) are proposed respectively for the training of the model-to-be-trained.

As shown in FIG. 2, MPLP takes the single-class label as an input and outputs a multi-label prediction $\bar{y}_i$; based on the memory feature set in the storage library M, $$\bar{y}_i = MPLP(y_i, M) \quad (4)$$

wherein MPLP (•) represents a MPLP calculation module, and $\bar{y}$ represents the predicted multi-class label.

MMCL takes the image feature f, the multi-class label $\bar{y}$ and the storage library M as inputs to calculate the multi-label classification loss. The calculated loss can be expressed as, $$L_{MMCL} = \sum_{i=1}^{n} D(M^T \times f_i, y_i) \quad (5)$$

wherein $M^T \times f_i$ is used to calculate the classification score, and D(•) represents the calculation of the loss by comparing the classification score and the multi-class label.

After each time of training and iteration, M is updated to:

$$M[i]^t = a \cdot f_i + (1-a) \cdot M[i]^{t-1} \quad (6)$$

wherein the superscript t represents the $t^{th}$ training epoch, and a is the update rate. Then $M[i]^t \leftarrow \|M[i]^t\|_2$ is used to L2-normalize $M[i]^t$. Both MPLP and MMCL need robust features in M to find reliable multi-class labels and classification scores respectively. Therefore, various data processing techniques are used to enhance M, and each memory feature M[i] combines the features of different enhanced samples in $x_i$, thus having a better robustness.

In MPLP, similarity and cycle consistency are simultaneously considered in order to predict $\bar{y}_i$, thus making the prediction more accurate than the classification score. Therefore, the loss calculated by formula (5) is made valid when enhancing the model-to-be-trained, and a positive feedback on M[i] and the classification label prediction is further generated. This cycle makes it possible to train a discriminative person re-identification model on an unlabeled data set.

As shown in formula (4), given an initial binary label (single-class label) $y_i$ of the image data $x_i$, MPLP aims to find other classes that $x_i$ may belong to. For $x_i$, MPLP first calculates a ranking list $R_i$ based on the similarity of $x_i$ with other memory features, namely:

$$R_i = \frac{\text{argsort}(s_{i,j}), j \in [1, n]}{j} \quad (7)$$

$$s_{i,j} = M[i]^T \times M[j] \quad (8)$$

wherein $s_{i,j}$ represents the similarity score of $x_i$ and $y_j$.

$R_i$ is a candidate ranking list of reliable labels found by $x_i$, that is, the first candidate labels, e.g., a plurality of labels with top ranking. However, changes in lighting, viewpoint, background will reduce the robustness of the ranking list. For example, noisy labels may appear at the top of the ranking list. In order to ensure the quality of the predicted multi-class labels, MPLP refers to the similarity scores and cycle consistency of the multi-class label prediction.

Figure 3:
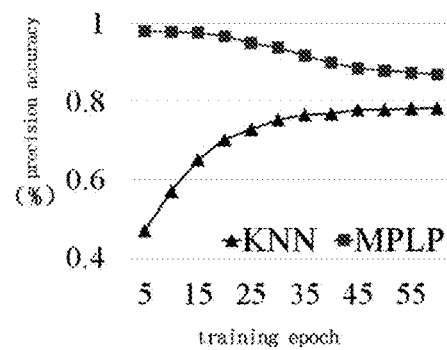
FIG. 3 is a schematic diagram illustrating the precision and recall rate of positive label prediction of a method for person re-identification provided by the present application.
Figure 3:
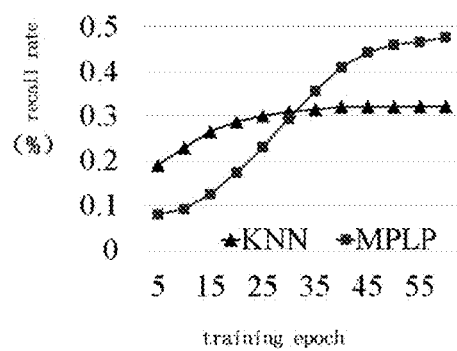
Figure 4:
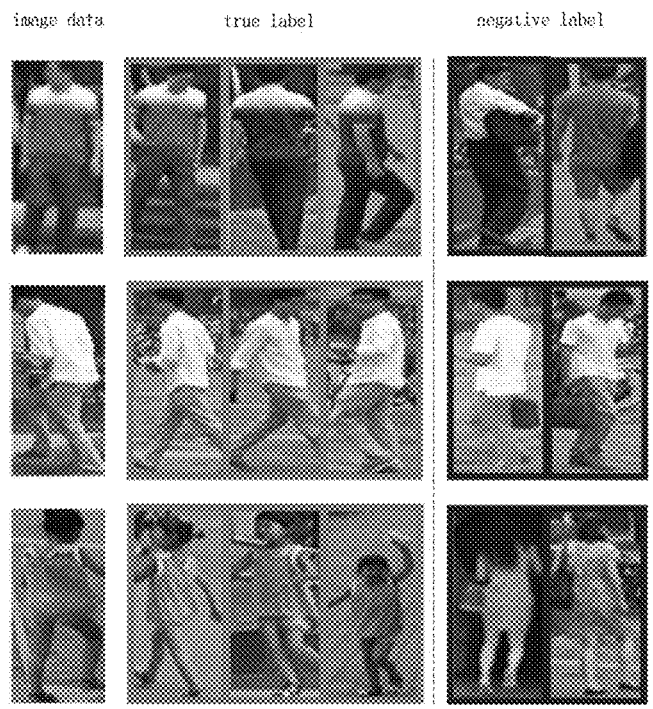
FIG. 4 is a schematic diagram illustrating a label prediction result of a method for person re-identification provided by the present application.

The labels are filtered based on the similarity scores: candidates for positive labels are selected according to the candidate ranking list of $x_i$. A candidate threshold is used to select the first candidate labels related to $x_i$. According to the preset candidate threshold t, $k_i$ label candidates can be generated by removing labels with a similarity less than t.

$$P_i = R_i[1 : k_i] \quad (9)$$

wherein $R_i[k_i]$ is the last label with a similarity score higher than t, $P_i$ is the first candidate label of $x_i$, and it is a set. t largely determines the number of candidate labels. Formula (9) adaptively searches for different numbers of first candidate labels for different image data, which is better than selecting a fixed number of labels (i.e., the K-Nearest Neighbor (kNN) classification algorithm in FIG. 3). The precision and recall curve of MPLP in searching for true positive labels are shown in FIG. 3, wherein MPLP is always better than KNN in different training stages. FIG. 4 shows the positive labels (true labels) and negative labels selected by MPLP, wherein the hard negative labels are effectively rejected by MPLP.

Next, the cycle consistency is introduced to find the positive label set from $P_i$.

Label filtering based on the cyclic consistency is to eliminate hard negative labels from the first candidate labels. If two images belong to the same class, their neighbor should also be similar. In other words, if two images can be given similar labels, they should be similar to each other.

Based on this, a cycle consistency solution is proposed to filter out the hard negative labels in the first candidate label $P_i$.

MPLP traverses the labels in $P_i$ from the beginning to the end. For the label j in $P_i$ the formula (7) is used in MPLP to calculate $k_j$ labels with the highest similarity scores. If label i is also one of the $k_j$ labels with the highest similarity scores, then j is regarded as a positive label of $x_i$. Otherwise, it will be regarded a hard negative label. When the first hard negative label is found, the traversing stops. By doing so, the positive label set $P_i^*$ and the hard negative labels of the image $x_i$ can be determined. The positive label set is expressed as follows:

$$P_i^* = P_i[1:l] \quad (10)$$

wherein l satisfies
$i \in R_{Pi[l]}[1:k_i] \& i \notin R_{Pi[l+1]}[1:k_l]$, $P_i^*$ contains l labels, and $x_i$ will be assigned a multi-class label $\bar{y}_i$ with l positive classes (multi-class label).

$i \in R_{Pi[l]}[1:k_i] \& i \notin R_{Pi[l+1]}[1:k_l]$ refers to an operation of ranking $P_i[l]$ according to the similarity scores; that is, according to the similarity scores, each label $P_i[l]$ is checked from the highest to the lowest. For the label $P_i[l]$, it is used as the image $x_i$, and then other labels are ranked to check the position of label $x_i$ in the ranking list of $P_i[l]$; if it is one of the first $k_i$ labels, then $P_i[l]$ is considered to be correct; otherwise, $P_i[l]$ is wrong. When the first wrong $P_i[l]$ is found, the process stops.

$$\bar{y}_i[j] = \begin{cases} 1 & j \in P_i^* \\ -1 & j \notin P_i^* \end{cases} \quad (11)$$

The predicted multi-class labels can be used in cooperation with the multi-label classification loss function to train the person re-identification model. In the traditional multi-label classification method, sigmoid and logistic regression loss is a common choice. For tasks of n classes, n independent binary classifiers are used for classification. The loss of classified image $x_i$ to class j can be calculated as follows:

$$l(j|x_i) = \log(1 + \exp(-\bar{y}_i[j] \times M[j]^T \times f_i)) \quad (12)$$

wherein $M[j]^T \times f_i$ is to calculate the classification score of the image $x_i$ of class j. $\bar{y}_i[j]$ is the label of the image $x_i$ of class j. Under the loss of a single class, the loss of multi-label classification (MCL), namely $L_{MCL}$, can be obtained:

$$L_{MCL} = \sum_{i=1}^{n} \sum_{j=1}^{n} l(j|x_i) \quad (13)$$

wherein n is the number of images in the data set X, which is equal to the number of classes in the setting.

Because $M[j]^T$ and $f_i$ are normalized by L2, the classification score is limited to $[-1; 1]$. This limits the scope of the sigmoid function in formula (12), so that even if the classification is correct, the loss is not zero. This can be solved by introducing a scalar $\tau$ to the classification score. This updates formula (12) to:

$$l_\tau(j|x_i) = \log(1 + \exp(-\bar{y}_i[j] \times M[j]^T \times f_i/\tau)) \quad (14)$$

The corresponding MCL loss is expressed as $L_{MCL\text{-}\tau}$. The gradient of $L_{MCL\text{-}\tau}$ can be calculated by formula (15), $$\frac{\partial L_{MCL\text{-}\tau}}{\partial f_i} = -\frac{\exp(-\bar{y}_i[j] M[j]^T f_i/\tau)}{1 + \exp(-\bar{y}_i[j] M[j]^T f_i/\tau)} \frac{\bar{y}_i[j] M[j]}{\tau} \quad (15)$$

Figure 5:
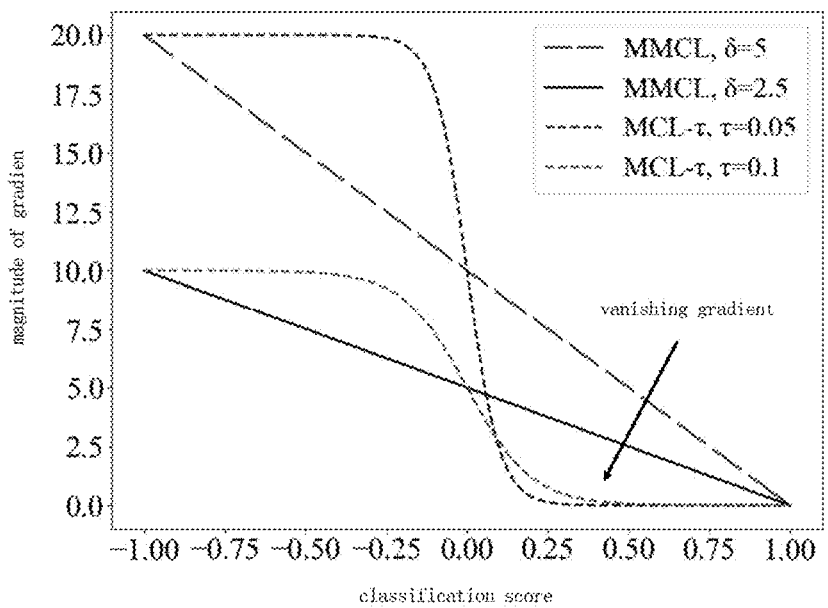
FIG. 5 is a schematic gradient diagram of a method for person re-identification provided by the present application.

As shown in FIG. 5, MCL-$\tau$ has a vanishing gradient problem, but MMCL does not have a vanishing gradient problem.

Using formula (15), the gradient of LMCL-$\tau$ with different values of $\tau$ when $\bar{y}_i[j]=1$ is illustrated in FIG. 5. Obviously, when the classification score is greater than 0.25 or less than −0.25, the updated MCL loss still has a significant vanishing gradient problem.

Another problem with MCL loss is that, because the task involves a large number of classes, the positive classes and negative classes are unbalanced. Treating these negative classes equally in formula (14) may cause the model to collapse. Therefore, it is recommended to use MMCL to solve these problems.

The memory-based multi-label classification loss MMCL is proposed in view of the two problems in traditional MCL. For the first problem, since the score is bounded by $[-1; 1]$, the sigmoid function may be abandoned, and the loss is calculated directly by regressing the classification score to 1 and −1. This simplifies the calculation of loss and improves training efficiency. The loss of classified image $x_i$ to class j can be updated to:

$$l^*(j|x_i) = \|M[j]^T \times f_i - \bar{y}_i[j]\|^2 \quad (16)$$

wherein $f_i$ is the feature of the image $x_i$.

The second problem is the imbalance between positive classes and negative classes. In MMCL, hard negative class mining is introduced to solve this problem. In deep metric learning, hard negative samples is more important for training. Therefore, in multi-label classification, training should be more focused on hard negative classes rather than easy negative classes.

For $x_i$, its negative classes may be expressed as $R_i \setminus P_i^*$. The negative classes are ranked according to their classification scores, and the top r % classes are selected as the hard negative classes. The set of hard negative classes of $x_i$ may be expressed as $N_i$, $|N_i| = (n - |P_i^*|) \cdot r$ %.

MMCL is calculated on the positive classes and the sampled hard negative classes, as shown in formula (17):

$$L_{MMCL} = \sum_{i=1}^{n} \frac{\delta}{|P_i^*|} \sum_{p \in P_i^*} l^*(p|x_i) + \frac{\delta}{|N_i|} \sum_{s \in N_i} l^*(s|x_i) \quad (17)$$

wherein $\delta$ is the coefficient that measures the importance of positive class loss and negative class loss, and will be tested in the experiment.

In FIG. 5, when $\bar{y}_i[j]=1$, the gradient of $L_{MMCL}$ is also illustrated, wherein the gradient of $L_{MMCL}$ can be calculated as follows:

$$\partial L_{MMCL}/\partial f_i = 2\delta(M[j]^T \times f_i - \bar{y}_i[j])M[j] \quad (18)$$

The comparison between MCL and MMCL in FIG. 5 clearly shows that MMCL effectively solves the problem of vanishing gradient. Since the gradient is vanishing, $L_{MCL\text{-}\tau}$ will not force the classifier to classify positive labels with higher scores. This is harmful for reducing the intra-class variance. Therefore, MMCL is more effective than MCL in optimizing the person re-identification model. FIG. 5 also shows that $\delta$ controls the magnitude of the gradient of MMCL. When the classification score is close to the decision boundary, the mean square loss is lower than a logarithm-based loss (such as cross-entropy). δ effectively solves this problem by adjusting the magnitude of the gradient of MMCL.

By adopting the hard negative class mining strategy, MMCL is not only suitable for multi-label classification, but can also be applied to single-label classification when there is still the problem of unbalanced classes in the single-label classification. As compared with cross-entropy loss and MCL, since the large number of classes reduce the speed of softmax calculation, and MMCL abandons activation functions such as softmax and sigmoid, the calculation efficiency is improved.

The method of the present application is also applicable to the transfer learning environment. Given a data set containing labeled person images, the commonly used cross-entropy loss and triplet loss functions can be used for the labeled data to train the model. The overall training loss $L_{transfer}$ of transfer learning be expressed as the sum of MMCL and training loss on the set of labeled data, namely:

$$L_{transfer} = L_{labeled} + L_{MMCL} \quad (19)$$

wherein $L_{labeled}$ is the training loss, which is the sum of the cross-entropy loss and the triplet loss.

Figure 6:
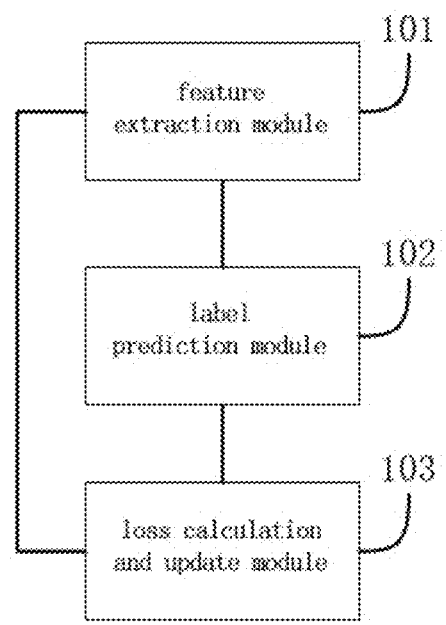
FIG. 6 is a schematic diagram of a system for person re-identification provided by the present application.

According to an embodiment of the present application, a system for person re-identification is further proposed; as shown in FIG. 6, the system for person re-identification includes:

a feature extraction module 101, which is configured to determine a single-class label and memory features of each image data in a training set input to a model-to-be-trained, and determine classification scores according to image features of each image data in the training set and a memory feature set;

a label prediction module 102, which is configured to determine multi-class labels through positive label prediction according to the single-class labels and the memory feature set; and a loss calculation and update module 103, which is configured to determine a multi-label classification loss according to the predicted multi-class labels and the classification scores, and update and train the model-to-be-trained to obtain a re-identification model according to the multi-label classification loss.

The re-identification model includes a feature extraction module and a label prediction module that are trained.

The embodiment of the present application preferably uses ResNet-50 as a backbone to extract features, and initializes it using pre-trained parameters on ImageNet. After the pooling-5 layer, the subsequent layers are removed and a batch normalization layer is added, which will generate 2048 dim features. During the test, pooling-5 features are also extracted to calculate the distance. For the multi-label classification, we allocate a memory M to store L2-normalized image features. The memory is initialized to all zeros, and when the memory is completely updated for 5 times (after 5 times), MPLP is used for label prediction. CamStyle is used as a data enhancement strategy for unlabeled image data. In order to improve the robustness of features, strategies such as random cropping, random rotation, color dithering and random deletion are also introduced.

In the method of the present application, by using various data processing techniques to enhance the memory feature set, the robustness can be enhanced; the classification scores are determined according to the image features of each image data in the training set and the memory feature set, which is not affected by the domain gap; the multi-class labels are determined through positive label prediction according to the single-class labels and the memory feature set; then, the multi-label classification loss is determined according to the multi-class labels and the classification scores, and the model-to-be-trained is updated and trained; wherein eliminating hard negative labels can improve the precision of model so that the resulting model has high re-identification performance, strong robustness and low cost.

Described above are only specific preferred embodiments of the present application, but the scope of protection of the present application is not limited to this. Any change or replacement that can be easily contemplated by those skilled in the art within the technical scope disclosed in the present application should be covered within the scope of protection of the present application. Therefore, the scope of protection of the present application shall be accorded with the scope of the claims.

The invention claimed is:

1. A method for person re-identification, comprising:
inputting a training set to a model-to-be-trained, and determining a single-class label and memory features of each image data in the training set;
determining multi-class labels through positive label prediction according to the single-class labels and a memory feature set;
determining classification scores according to image features of each image data in the training set and the memory feature set;
determining a multi-label classification loss according to the multi-class labels and the classification scores; and
updating and training the model-to-be-trained to obtain a re-identification model according to the multi-label classification loss.

2. The method for person re-identification according to claim 1, wherein the determining the single-class label and memory features of each image data in the training set comprises:
labeling each image data in the unlabeled training set using a single-class label to obtain multiple single-class labels; and
performing feature extraction on the unlabeled training set to obtain image features, and using a memory feature update formula to calculate memory features so as to obtain a memory feature set that comprises all the memory features.

3. The method for person re-identification according to claim 2, wherein the memory feature update formula is: $M[i]^t = a \cdot f_i + (1-a) \cdot M[i]^{t-1}$, and wherein the superscript t represents the $t^{th}$ training epoch, a is an update rate, M[i] is the memory feature set, and $f_i$ is the image feature.

4. The method for person re-identification according to claim 3, wherein before obtaining the memory feature set that comprises all the memory features, the method further comprises:
normalizing the obtained memory features.

5. The method for person re-identification according to claim 1, wherein the determining multi-class labels through positive label prediction comprises:
calculating similarity scores between the memory features in the memory feature set;
determining first candidate labels of each image data according to the single-class label, the similarity scores and a candidate threshold;

eliminating hard negative labels from the first candidate labels to obtain a second candidate label set corresponding to each image data;
setting the second candidate labels in each second candidate label set to 1 to obtain a positive label set corresponding to the second candidate label set; and
determining the multi-class label corresponding to each image data according to the positive label set.

6. The method for person re-identification according to claim 1, wherein the determining the multi-label classification loss according to the multi-class labels and the classification scores comprises:
determining the multi-label classification loss according to the multi-class labels and the classification scores by using a multi-label classification loss formula, the multi-label classification loss formula being:

$$L_{MMCL} = \sum_{i=1}^{n} D(M^T \times f_i, \bar{y}_i),$$

wherein the classification score is $M^T \times f_i$, $\bar{y}_i$ is the multi-class label, and $D(\cdot)$ is the calculation of the multi-label classification loss $L_{MMCL}$ by comparing the classification score and the multi-class label.

7. The method for person re-identification according to claim 1, wherein after updating and training the model-to-be-trained to obtain the re-identification model according to the multi-label classification loss, the method further comprises:
using the obtained re-identification model to re-identify persons.

8. The method for person re-identification according to claim 1, wherein before updating and training the model-to-be-trained to obtain the re-identification model according to the multi-label classification loss, the method further comprises:
if there is a labeled data set, using the sum of cross-entropy loss, triplet loss and the multi-label classification loss as the loss of updating and training the model-to-be-trained.

9. The method for person re-identification according to claim 1, wherein each image data in the training set is unlabeled data, and each image data comprises only one person.

10. A system for person re-identification, comprising:
a feature extraction module, which is configured to determine a single-class label and memory features of each image data in a training set input to a model-to-be-trained, and determine classification scores according to image features of each image data in the training set and a memory feature set;
a label prediction module, which is configured to determine multi-class labels through positive label prediction according to the single-class labels and the memory feature set; and
a loss calculation and update module, which is configured to determine a multi-label classification loss according to the multi-class labels and the classification scores, and update and train the model-to-be-trained to obtain a re-identification model according to the multi-label classification loss.

* * * * *